(12) United States Patent
Lau et al.

(10) Patent No.: US 8,761,236 B2
(45) Date of Patent: Jun. 24, 2014

(54) SERIAL PROTOCOL FOR AGILE SAMPLE RATE SWITCHING

(75) Inventors: King-Hon Lau, Breinigsville, PA (US); Johannes G. Ransijn, Wyomissing Hills, PA (US); Harold T. Simmonds, Stewartsville, NJ (US); James D. Yoder, Leola, PA (US)

(73) Assignee: Agere Systems LLC, Allentown, PA (US)

(*) Notice: Subject to any disclaimer, the term of this patent is extended or adjusted under 35 U.S.C. 154(b) by 0 days.

(21) Appl. No.: 13/444,928

(22) Filed: Apr. 12, 2012

(65) Prior Publication Data

US 2012/0195354 A1    Aug. 2, 2012

Related U.S. Application Data

(63) Continuation of application No. 11/206,314, filed on Aug. 17, 2005, now Pat. No. 8,213,489, which is a continuation-in-part of application No. 11/159,614, filed on Jun. 23, 2005, now Pat. No. 7,773,733, which is a continuation-in-part of application No. 11/159,537, filed on Jun. 23, 2005, now Pat. No. 7,940,921.

(51) Int. Cl.
    H04B 1/38    (2006.01)
(52) U.S. Cl.
    USPC .............................................. 375/220
(58) Field of Classification Search
    USPC .................................. 375/219, 220
    See application file for complete search history.

(56) References Cited

U.S. PATENT DOCUMENTS

| | | |
|---|---|---|
| 3,934,099 A | 1/1976 | Elder, Jr. |
| 4,684,823 A | 8/1987 | Dayton et al. |
| 5,027,264 A | 6/1991 | DeDoncker et al. |

(Continued)

FOREIGN PATENT DOCUMENTS

| | | |
|---|---|---|
| CN | 1152825 | 6/1997 |
| CN | 1466808 A | 1/2004 |

(Continued)

OTHER PUBLICATIONS

Non Final Office Action; Mailed Aug. 1, 2008 for corresponding U.S. Appl. No. 11/206,314.

(Continued)

Primary Examiner — Kevin M Burd
(74) Attorney, Agent, or Firm — Mendelsohn, Drucker & Dunleavy, P.C.; David L. Cargille; Steve Mendelsohn

(57) ABSTRACT

The invention provides a communication protocol and serial interface having an approximately fixed interface clock and capable of accommodating a variety of communication rates. The interface employs a variable-length frame that may be expanded or reduced to obtain a desired communication rate, even though the interface clock rate is held approximately constant. The invention further provides a method for designing an agile barrier interface. In particular, the barrier clock rate is preferably selected to be an approximate common multiple of the various communication rates that the barrier interface must handle. The frame length corresponding to each communication rate may then be obtained by dividing the barrier clock rate by the ΣΔ rate. Finally, the invention provides an agile barrier capable of communicating data across a serial interface at a variety of data rates and at an approximately fixed interface clock rate.

25 Claims, 3 Drawing Sheets

(56) References Cited

U.S. PATENT DOCUMENTS

| | | | |
|---|---|---|---|
| 5,504,811 A | 4/1996 | Kiko et al. | |
| 5,594,734 A | 1/1997 | Worsley et al. | |
| 5,768,351 A | 6/1998 | England | |
| 5,818,298 A | 10/1998 | Dent et al. | |
| 6,225,927 B1 | 5/2001 | Scott et al. | |
| 6,297,755 B2 | 10/2001 | Scott et al. | |
| 6,347,128 B1 | 2/2002 | Ransijn | |
| 6,359,973 B1 | 3/2002 | Rahamim et al. | |
| 6,385,235 B1 | 5/2002 | Scott et al. | |
| 6,392,457 B1 | 5/2002 | Ransijn | |
| 6,404,780 B1 | 6/2002 | Laturell et al. | |
| 6,421,735 B1 | 7/2002 | Jung et al. | |
| 6,430,229 B1 | 8/2002 | Scott et al. | |
| 6,519,339 B1 | 2/2003 | Sacca et al. | |
| 6,570,513 B2 | 5/2003 | Scott et al. | |
| 6,577,109 B2 | 6/2003 | Dancy et al. | |
| 6,611,553 B1 | 8/2003 | Scott et al. | |
| 6,647,101 B2 | 11/2003 | Rahamim et al. | |
| 6,654,409 B1 | 11/2003 | Scott et al. | |
| 6,661,553 B2 | 12/2003 | Zami et al. | |
| 6,665,361 B1 | 12/2003 | Christodoulides et al. | |
| 6,674,857 B1 | 1/2004 | Fischer et al. | |
| 6,683,548 B2 | 1/2004 | Scott et al. | |
| 6,731,655 B1 | 5/2004 | Shuto et al. | |
| 6,731,728 B2 | 5/2004 | Hollenbach et al. | |
| 6,732,728 B2 | 5/2004 | Hill et al. | |
| 6,735,657 B1 | 5/2004 | Falk et al. | |
| 6,757,381 B1 | 6/2004 | Worley | |
| 6,778,665 B1 | 8/2004 | Fischer et al. | |
| 6,876,742 B1 | 4/2005 | Sacca | |
| 7,088,803 B2 | 8/2006 | Rahamim et al. | |
| 7,187,527 B2 | 3/2007 | Su et al. | |
| 7,190,716 B2 | 3/2007 | Norrell et al. | |
| 7,295,578 B1* | 11/2007 | Lyle et al. | 370/503 |
| 7,433,348 B1 | 10/2008 | Bordui et al. | |
| 7,528,891 B2 | 5/2009 | Miyamoto | |
| 8,213,489 B2* | 7/2012 | Lau et al. | 375/220 |
| 2001/0031016 A1* | 10/2001 | Seagraves | 375/264 |
| 2002/0048180 A1 | 4/2002 | Dancy et al. | |
| 2003/0086435 A1 | 5/2003 | Cooley et al. | |
| 2003/0093703 A1 | 5/2003 | Oliver et al. | |
| 2003/0156672 A1* | 8/2003 | O'Shea et al. | 375/365 |
| 2003/0174778 A1 | 9/2003 | Webster | |
| 2004/0057511 A1 | 3/2004 | Liu | |
| 2004/0217743 A1 | 11/2004 | Brown et al. | |
| 2004/0217837 A1 | 11/2004 | Orr et al. | |
| 2004/0239310 A1 | 12/2004 | Oshima et al. | |
| 2005/0195922 A1* | 9/2005 | Maeda et al. | 375/341 |
| 2006/0262888 A1* | 11/2006 | Mathew et al. | 375/355 |

FOREIGN PATENT DOCUMENTS

| | | | |
|---|---|---|---|
| CN | 1521599 A | 8/2004 | |
| JP | 57-132459 A | 8/1982 | |
| JP | 2-214244 A | 8/1990 | |
| JP | 5103021 A | 4/1993 | |
| JP | 5-36997 U | 5/1993 | |
| JP | 8079228 A | 3/1996 | |
| JP | 9247571 A | 9/1997 | |
| JP | 10042002 A | 2/1998 | |
| JP | 11041193 A | 2/1999 | |
| JP | 2002027362 A | 1/2002 | |
| JP | 2002208973 A | 7/2002 | |
| JP | 2002311999 A | 10/2002 | |
| JP | 2004069773 A | 3/2004 | |
| JP | 2004080557 A | 3/2004 | |

OTHER PUBLICATIONS

Non Final Office Action; Mailed Mar. 20, 2009 for corresponding U.S. Appl. No. 11/206,314.

Final Office Action; Mailed Nov. 20, 2009 for corresponding U.S. Appl. No. 11/206,314.

Advisory Action; Mailed Jan. 26, 2010 for corresponding U.S. Appl. No. 11/206,314.

Non Final Office Action; Mailed Jul. 1, 2010 for corresponding U.S. Appl. No. 11/206,314.

Non Final Office Action; Mailed Dec. 2, 2010 for corresponding U.S. Appl. No. 11/206,314.

Notice of Allowance; Mailed Jan. 12, 2012 for corresponding U.S. Appl. No. 11/206,314.

Response to 312 Amendment; Mailed Apr. 16, 2012 for corresponding U.S. Appl. No. 11/206,314.

International Search Report; Mailed Apr. 3, 2007 for corresponding PCT Application No. PCT/US06/23660.

Chinese Office Action; Mailed May 18, 2011 for corresponding CN Application No. 200680017484.4.

Chinese Office Action; Mailed Aug. 31, 2011 for corresponding CN Application No. 200680017484.4.

Chinese Office Action; Mailed Nov. 16, 2011 for corresponding CN Application No. 200680017484.4.

Japanese Office Action; Mailed Jan. 25, 2012 for corresponding JP Application No. 2008-518261.

CX81300; SmartACF; V.92/V.90/V.34/V.32bis; Single Chip ACF Modem With CX20493 Smart DAA and Optional CX20422 Voice Codec Data Sheet, Doc No. 102260B—Aug. 26, 2003—Conexant.

Global Serial Interface Direct Access Arrangement—Silicon Laboratories—Si3056—Si3018/19 Preliminary REv. 0.713/03—Copyright 2003 by Silicon Laboratories.

Taiwan Search Report; Mailed Feb. 19, 2013 for corresponding Taiwan Application No. 095122754.

Notification of the First Office Action; Mailed May 30, 2013 for related CN Application No. 201210153127.8.

Chinese Office Action; Mailed Dec. 17, 2013 for corresponding CN Application No. 201210153127.8.

Japanese Notice of Reason for Refusal; Mailed Nov. 26, 2013 for corresponding JP Application No. 2012-164502.

* cited by examiner

SERIAL PROTOCOL FOR AGILE SAMPLE RATE SWITCHING

CROSS-REFERENCES

This application is a continuation of U.S. patent application No. 11/206,314, now U.S. Pat. No. 8,213,489 which is (i) a continuation-in-part of U.S. patent application Ser. No. 11/159,614 filed Jun. 23, 2005, and issued as U.S. Pat. No. 7,773,733 on Aug. 10, 2010, and (ii) a continuation-in-part of U.S. patent application Ser. No. 11/159,537 filed Jun. 23, 2005, and issued as U.S. Pat. No. 7,940,921 on May 10, 2011, which are incorporated by reference in their entirety.

FIELD OF THE INVENTION

The present invention relates generally to digital communication between line-side and system-side circuits in a modem or digital access arrangement ("DAA").

BACKGROUND

A modern modem 100, as illustrated in FIG. 1, typically includes a digital signal processor or microprocessor 102, a coder/decoder ("codec") 132 for converting digital signals from the DSP 102 to an analog form capable of transmission over a telephone line and for converting analog signals from the telephone line to digital form, and high-voltage ("HV") components 130 that interface with the telephone line. In order to isolate the DSP 102 from voltage fluctuations on the telephone line, the codec function is conventionally implemented via two circuits—a system-side interface circuit ("SSIC") 106 and a line-side interface circuit ("LSIC") 118, which communicate across an isolation barrier 117.

The SSIC 106 includes a system I/O interface 108 for communication with the DSP 102, a conventional sigma-delta modulator 112 for converting forward-going data signals to forward-going sigma-delta signals, a conventional integrator-based sigma-delta decoder circuit for decoding reverse-going sigma-delta signals into data signals, and an isolation barrier interface circuit 114 for transmitting and receiving sigma-delta signals to and from the LSIC 118 across the isolation barrier 117. The SSIC 106 may further include a protocol framing circuit 116, which functions to organize the data transmitted and received by the isolation barrier interface circuit 114, and a barrier clock controller 113 and associated voltage-controlled oscillator 115, which together form a variable-rate clock generator for generating the barrier clock signal.

The LSIC 118 includes an isolation barrier interface circuit 120, a line-side sigma-delta digital-to-analog converter ("DAC") 126 whose output is connected to a transmit buffer 128, and a sigma-delta analog-to-digital converter ("ADC") 122 whose input is connected to a receive buffer 124. The LSIC 118 may further include a conventional clock-and-data recovery circuit 125 to derive a local clock signal from the received signals from the isolation barrier. Each of isolation barrier interface circuits 114, 120 may be any suitable isolation barrier interface circuit for communication across an isolation barrier, such as that described in U.S. patent application Ser. Nos. 11/159,537 and 11/159,614 incorporated above.

Conventional modems typically also must accommodate a wide variety of communication rates. For example, a modem complying with the CCITT v.34 standard must be capable of communicating at a variable symbol rate (or baud rate) that may range from 2400 Hz-3429 Hz, as illustrated in Table 1 below.

TABLE 1

| Application | Symbol rate [Hz] | Sample rate [Hz] | ΣΔ Rate [MHz] |
|---|---|---|---|
| V.34 | 2400 | 7200 | 1.8432 |
| Audio | N/A | 8000 | 2.0480 |
| V.34 | 2743 | 8228 | 2.1066 |
| V.34 | 2800 | 8400 | 2.1504 |
| V.34 | 3000 | 9000 | 2.3040 |
| V.34 | 3200 | 9600 | 2.4576 |
| V.34 | 3429 | 10287 | 2.6335 |
| Audio/optional | N/A | 11025 | 2.8224 |

If the ADC sampling rate is selected to be factor of 3 times the symbol rate, the ADC 122 must have a sampling rate ranging from 7200 Hz-10,287 Hz (and as high as 11,025 Hz if the telephone signal is an analog audio signal rather than a digital modem signal). In addition, the sigma-delta (ΣΔ) rate is conventionally selected so that the analog signal is oversampled at a predetermined multiple (e.g., 256) times the sampling rate. As such, the sigma-delta ACD 122 must operate at a sigma-delta rate that ranges between 1.843 MHz and 2.822 MHz.

This wide range of the required sigma-delta rate (1.843 MHz-2.822 MHz) represents a design constraint on the barrier interface (the communication link formed by interface circuits 114 and 120 and isolation barrier 117). For successful full-duplex operation, during each ΣΔ sample interval, one forward ΣΔ sample and one reverse ΣΔ sample must be communicated across the isolation barrier between the SSIC 106 and the LSIC 118. In other words, the data rate of the barrier interface must be variable, depending on the sigma-delta rate.

The desired variable data rate for the barrier interface has conventionally been obtained by varying the barrier clock rate to obtain the desired data rate. In a simplified example, if the modem 100 establishes a v.34 communication with another modem at a symbol rate of 2,400 Hz (for which a ΣΔ rate of 1.843 MHz is needed), the DSP 102 or some other barrier clock controller 113 may set the barrier clock rate to a rate equal to two times 1.843 MHz, or 3.686 MHz, so that during each ΣΔ interval, at least one forward ΣΔ sample and one reverse ΣΔ sample may be transmitted across the barrier interface. In contrast, if the modem 100 establishes a v.34 communication at a symbol rate of 3,429 Hz (for which a ΣΔ rate of 2.634 MHz is needed, per Table 1), the barrier clock may be set to a rate of two times 2.634 MHz, or 5.268 MHz, again so that during each ΣΔ interval, at least one forward ΣΔ sample and one reverse ΣΔ sample may be transmitted across the barrier interface. Thus, the clock rate in this simplified example would have to be able to operate over the range from 3.686 MHz to 5.268 MHz (i.e., an increase of 42%) to accommodate the full range of v.34 symbol rates. Moreover, the barrier clock rate would have to be correspondingly increased if control and status information was to be communicated during each ΣΔ interval.

Unfortunately, this conventional technique of varying the barrier clock as a function of the symbol rate or sigma-delta rate causes at least two difficulties. First, if the LSIC 118 derives its local clock from the barrier signals via a clock recovery circuit, the clock recovery circuit loses synchronism with the barrier signals each time the barrier clock changes. Until the clock recovery circuit re-acquires the new clock rate, the SSIC 106 and the LSIC 118 are unable to communicate. Second, the clock generating circuit in the SSIC 106 and the clock recovery circuit in the LSIC 118 are relatively complicated and expensive, because they must accommodate the entire range of clock rates across the barrier.

SUMMARY OF THE INVENTION

Having identified the above difficulties associated with a variable-clock-rate barrier interface, the present inventors developed an innovative communication protocol and barrier interface having an approximately fixed barrier clock and capable of accommodating a variety of symbol rates, sampling rates and/or sigma-delta rates (collectively, "communication rates"). More particularly, the invention employs a variable-length frame that may be expanded or reduced to reach a desired communication rate, even though the barrier clock rate is held approximately constant. Each master frame preferably includes a fixed-length data portion and a variable-length dummy portion. For a fast communication rate, the variable-length dummy portion may be small, such that the overall frame length is small and many frames may be transmitted during a given time period. For a slow communication rate, the variable-length dummy portion may be large, such that the overall frame length is large and only a few frames may be transmitted during the same time period. Thus, the minimum frame length corresponds to the fastest communication rate, while the maximum frame length corresponds to the slowest communication rate.

The invention further provides a method for designing an agile barrier interface. In particular, the barrier clock rate is preferably selected to be an approximate common multiple of the various communication rates that the barrier interface must handle. The frame length corresponding to each communication rate may then be obtained by dividing the barrier clock rate by the $\Sigma\Delta$ rate.

Finally, the invention provides an agile communication circuit capable of communicating data across a serial interface at a variety of data rates and at an approximately fixed interface clock rate.

BRIEF DESCRIPTION OF THE DRAWINGS

Various embodiments of the present invention will now be described in detail in conjunction with the annexed drawings, in which.

DETAILED DESCRIPTION

Figure 2:
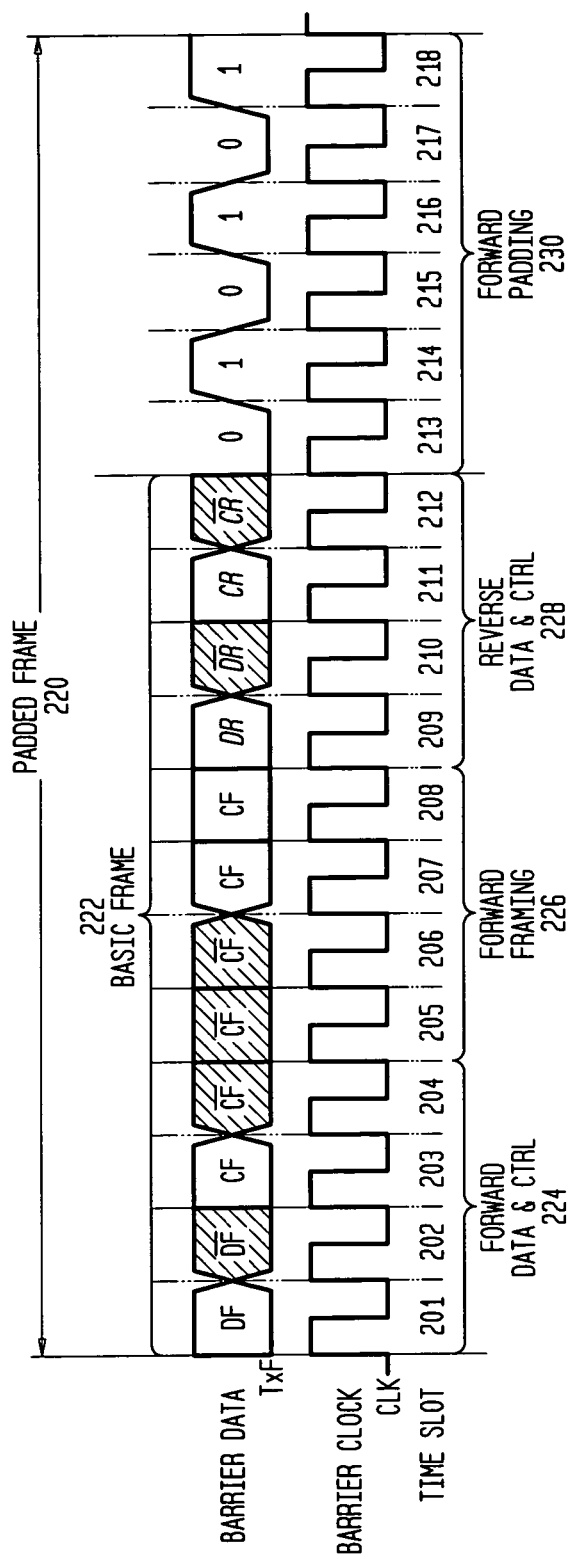
FIG. 2 is a timing diagram depicting a communication protocol using a variable-length frame in accordance with the invention.

As described above, the invention employs a variable-length frame that may be expanded or reduced to reach a desired communication rate notwithstanding an approximately fixed barrier clock. An exemplary communication protocol using such a frame is depicted in FIG. 2. Padded frame 220 includes a basic frame 222 (i.e., the fixed-length data portion) and a number of padding bits 230 (the variable-length dummy portion).

The specific composition of the basic frame 222 will depend on whether the barrier interface has only a single serial communication link or multiple communication links.

FIG. 2 depicts an example of the former case, in which the barrier interface is a single serial communication link over which both forward- and reverse-going sigma-delta data and forward- and reverse-going control information is to be transmitted during each master frame. In the frame shown in FIG. 2, therefore, the SSIC 106 transmits during time slots 201-208 and the LSIC 118 transmits during time slots 209-212.

In order to preserve the flux-balance in the isolation barrier, each transmitted bit is preferably Manchester encoded using a conventional encoder. That is, a "0" bit is encoded as the two-bit sequence 01 and a "1" bit is encoded as the two-bit sequence 10. It should be understood that if flux-balance is not a design concern (e.g., where the isolation barrier is a capacitive barrier), such encoding is not required.

As shown in FIG. 2, the basic frame 222 preferably includes:

(1) a forward data bit during time slots 201 and 202 (shown Manchester-encoded as DF, followed by NOT DF), transmitted by SSIC 106;

(2) a forward control bit during time slots 203 and 204 (shown as CF, NOT CF), transmitted by SSIC 106;

(3) a predetermined forward framing sequence 326 during time slots 205-208 (shown as NOT CF, NOT CF, CF, CF) (transmitted by either SSIC 106 or LSIC 118);

(4) a reverse data bit during time slots 209 and 210 (shown as DR, NOT DR), transmitted by LSIC 118; and (5) a reverse control bit during time slots 211 and 212 (shown as CR, NOT CR), transmitted by LSIC 118.

It will be recognized, however, that if multiple communication links are available, then the barrier interface can be simplified by making the links uni-directional. If so, then the basic frame may be reduced to the sigma-delta data, control and forward framing sequence for a single direction (i.e., forward or reverse).

The forward framing sequence may be any unique sequence of bit values that may be used to identify where a frame starts and/or ends. For example, in the protocol shown in FIG. 2, the inverse control bit (NOT CF) in time slot 204 is repeated twice thereafter, in time slots 205 and 206. This thrice-repeated value provides a unique synchronization ("sync") pattern that may readily be identified, insofar as Manchester encoded signals (01, 10) ordinarily do not result in a three-time-slot sequence of the same values. A suitable detection circuit for this sync pattern may be implemented, for example, via a three-bit shift register, where each bit in the register is provided to a 3-input AND gate that outputs a signal when the thrice-repeated value is detected. Other frame detection techniques may also be used in lieu of the sync pattern described above. For example, a large buffer may be used to store incoming data, and the buffered data may then be statistically analyzed by a microprocessor to determine the framing, in accordance with techniques known in the art.

Padded frame 220 preferably also includes dummy or padding bits 230, which may be added or removed to adjust the frame size. In this way, a wide variety of data rates may be accommodated without altering the clock rate of the SSIC 180 and the LSIC 182. By way of example, six padding bits (e.g., 0, 1, 0, 1, 0, 1), of alternating values in order to achieve flux balance, are depicted in time slots 213-218. These padding bits may be provided by either the SSIC 106 or the LSIC 118 after the interface has been initialized.

Figure 3:
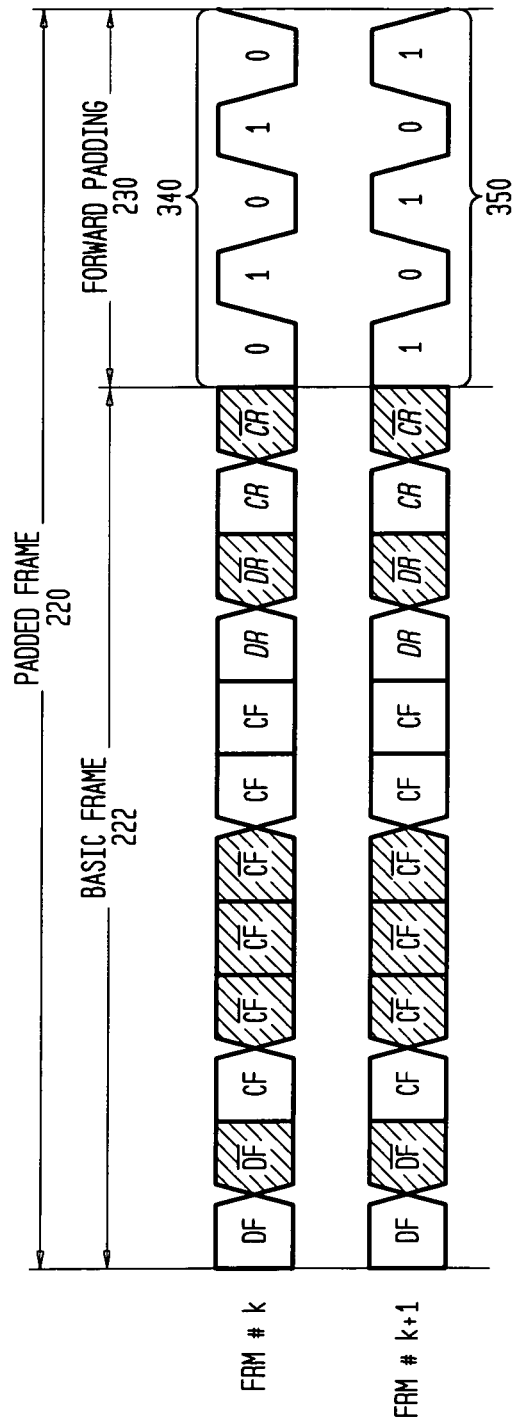
FIG. 3 is a timing diagram depicting a further communication protocol for balancing the flux of the isolation barrier over consecutive frames in accordance with the invention.

FIG. 3 illustrates how an odd number of padding bits may be accommodated without disrupting the flux balance of the isolation barrier. In essence, the flux of the padding bits is balanced over two consecutive frames, Frame k and Frame k+1 by using alternating sequences of 0's and 1's. For example, if frame k contains the padding bit sequence [01010], frame k+1 may contain the sequence [10101].

The invention further provides a method for designing an agile barrier interface. In accordance with the invention, a designer selects a barrier clock rate that is an approximate common multiple of the various data rates that the barrier interface must handle. The designer may then calculate the frame length corresponding to each data rate, by dividing the barrier clock rate by the sigma-delta rate. By way of example and not of limitation, Table 2 below illustrates exemplary frame lengths and barrier clock frequencies calculated for a barrier interface capable of handling sample rates of 7200, 8000, 8229, 8400, 9000, 9600, 10,287, and 11,025 Hz, where the sigma-delta rate is selected to be 256 times the sample rate.

TABLE 2

| Application | Symbol rate [Hz] | Sample rate [Hz] | ΣΔ Rate [MHz] | Frame Length [bits] | Barrier Clock [MHz] |
|---|---|---|---|---|---|
| V.34 | 2400 | 7200 | 1.8432 | 18 | 33.1776 |
| Audio | N/A | 8000 | 2.0480 | 16 | 32.7680 |
| V.34 | 2743 | 8228 | 2.1066 | 16 | 33.7056 |
| V.34 | 2800 | 8400 | 2.1504 | 15 | 32.2560 |
| V.34 | 3000 | 9000 | 2.3040 | 14 | 32.2560 |
| V.34 | 3200 | 9600 | 2.4576 | 14 | 34.4064 |
| V.34 | 3429 | 10287 | 2.6335 | 13 | 34.2355 |
| Audio/optional | N/A | 11025 | 2.8224 | 12 | 33.8688 |

As reflected in Table 2, one of the approximate common multiples of the above sigma-delta rates (i.e., 1.843-2.822 MHz) is about 33.3 MHz, which is taken as the approximately fixed barrier clock rate. Given the approximately fixed frame barrier clock rate of about 33.3 MHz, the frame length corresponding to each sigma-delta rate may be calculated by dividing the sigma-delta rate into the frame barrier clock frequency. For example, the frame length corresponding to the highest-frequency sigma-delta rate, 2.822 MHz, is calculated as 33.3 MHz/2.822 MHz, or 11.8 clock cycles, which may be rounded up to 12 clock cycles, as shown in Table 2. Similarly, the frame length corresponding to the lowest-frequency sigma-delta rate, 1.843 MHz, is calculated as 33.3 MHz/1.843 MHz, yielding 18.1 clock cycles, which may be rounded down to 18 clock cycles to obtain the frame length corresponding to the 1.843 MHz sigma-delta rate.

TABLE 3

| Application | Symbol rate [Hz] | Sample rate [Hz] | ΣΔ Rate [MHz] | Frame Length [bits] | Barrier Clock [MHz] |
|---|---|---|---|---|---|
| V.34 | 2400 | 7200 | 1.8432 | 20 | 36.864 |
| Audio | N/A | 8000 | 2.0480 | 18 | 36.864 |
| V.34 | 2743 | 8228 | 2.1066 | 17 | 35.813 |
| V.34 | 2800 | 8400 | 2.1504 | 17 | 36.557 |
| V.34 | 3000 | 9000 | 2.3040 | 16 | 36.864 |
| V.34 | 3200 | 9600 | 2.4576 | 15 | 36.864 |
| V.34 | 3429 | 10287 | 2.6335 | 14 | 36.869 |
| Audio/optional | N/A | 11025 | 2.8224 | 13 | 36.691 |

Table 3 illustrates an example in which a different approximate common multiple of the above sigma-delta rates is selected to be the approximately fixed barrier clock rate—namely, about 36 MHz. Given the approximately fixed frame barrier clock rate of about 36 MHz, the frame length corresponding to each sigma-delta rate is calculated by dividing the sigma-delta rate into the frame barrier clock rate. Thus, the frame length corresponding to the highest-frequency sigma-delta rate, 2.822 MHz, is calculated as 36 MHz/2.822 MHz, yielding 13 clock cycles. Similarly, the frame length corresponding to the lowest-frequency sigma-delta rate, 1.843 MHz, is calculated as 36 MHz/1.843 MHz, yielding 20 clock cycles.

The method for designing the barrier interface may further include adjusting the approximately fixed barrier clock rate for each sigma-delta rate, whereby rounding errors that are introduced during the selection of the frame length may be corrected. More specifically, after the selection of the approximately fixed barrier clock rate and the frame lengths corresponding to the various sigma-delta rates, a customized barrier clock rate may be selected for each sigma-delta rate, by multiplying each delta sigma rate by its corresponding frame length. Thus, for the example of Table 2, the customized barrier clock rate for a 1.843 MHz sigma-delta rate, with a length of 18 cycles, may be calculated as 33.1776 MHz. Similarly, the customized barrier clock rate for a 2.822 MHz delta sigma rate and a frame length of 12 cycles is 33.8688 MHz. Customized barrier clock rates may be similarly calculated for the remaining sigma-delta rates shown in Table 2. It may be seen from Table 2 that a barrier interface capable of transmitting information at symbol rates including 2400, 2743, 2800, 3000, 3200, and 3429 will preferably be capable of operation at the corresponding customized barrier clock rates shown in Table 2, which range between about 32 MHz and about 35 MHz. The customized barrier clock rates shown in Table 3 may be calculated in a similar manner, resulting in customized barrier clock rates of between about 35 MHz and about 37 MHz.

Figure 1:
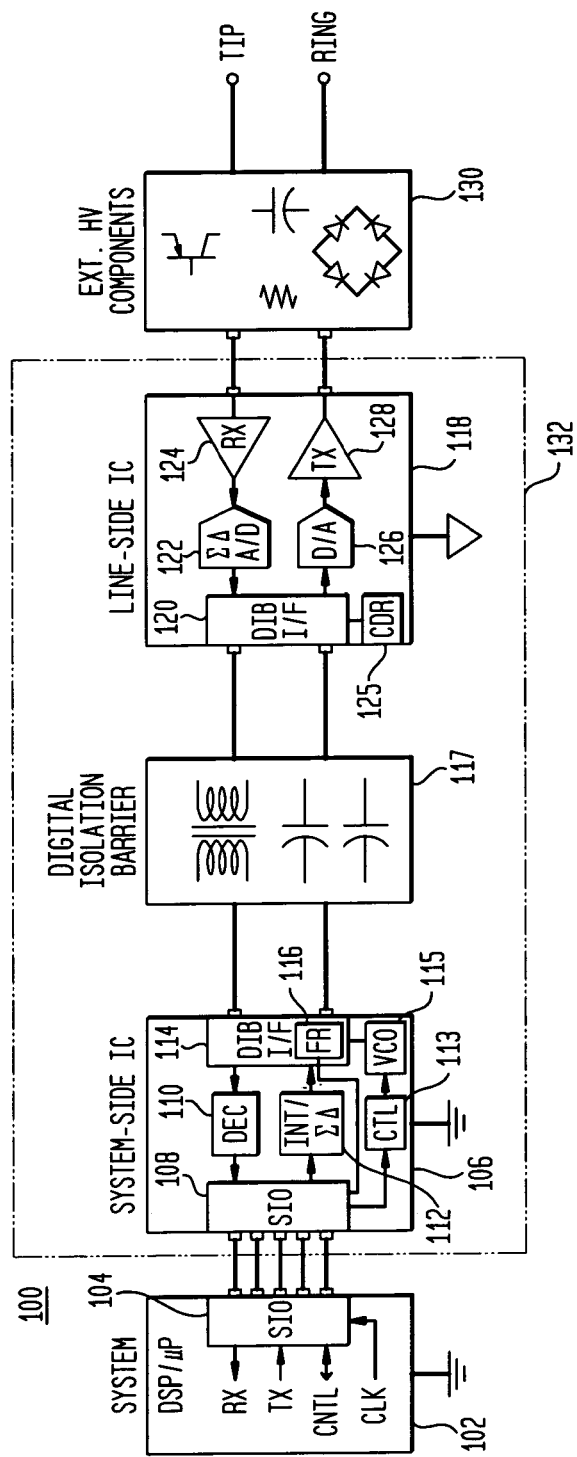
FIG. 1 is a block diagram depicting a communication circuit suitable for use in the invention.

The invention further provides an agile communication circuit capable of communicating data across a serial interface at a variety of data rates and at an approximately fixed interface clock rate. Such a communication circuit may be implemented using conventional modem or DAA components as shown in FIG. 1 and as described above in the Background section. In particular, modem processor/DSP 102 includes a circuit and/or software of a type well-known to those of ordinary skill in the art of modem design for selecting a communication rate (e.g., a desired symbol rate, sample rate, or sigma-delta rate). The SSIC 106 includes a system I/O interface 108 for communicating with the DSP 102, a conventional sigma-delta modulator 112 for converting forward-going data signals to forward-going sigma-delta signals, a conventional integrator-based sigma-delta decoder circuit for decoding reverse-going sigma-delta signals into data signals, and an isolation barrier interface circuit 114 for transmitting and receiving sigma-delta signals to and from the LSIC 118 across the isolation barrier 117. The SSIC 106 further includes a protocol framing circuit 116, which buffers and organizes the data transmitted and received by the isolation barrier interface circuit 114. The SSIC 106 further includes a variable-rate clock generator comprising barrier clock controller 113 and associated voltage-controlled oscillator 115, for generating a variable-rate barrier clock signal.

The LSIC 118 includes an isolation barrier interface circuit 120, a line-side sigma-delta digital-to-analog converter ("DAC") 126 whose output is connected to a transmit buffer 128, and a sigma-delta analog-to-digital converter ("ADC") 122 whose input is connected to a receive buffer 124. The LSIC 118 may further include a clock-and-data recovery circuit 125 to derive a local clock signal from the signals received across the isolation barrier.

The agile communication circuit described above operates as follows. First, modem processor/DSP 102 selects a frame length and interface clock rate for the digital isolation barrier based on a desired communication rate (i.e., modem symbol rate, sample rate, or sigma-delta rate)—e.g., by looking up the frame length and interface clock rate in a look-up table. Modem processor/DSP 102 then communicates the selected interface clock rate to the barrier clock controller 113 in SSIC 106. The barrier clock controller 113 receives the selected interface clock rate and outputs a corresponding analog signal to the voltage controlled oscillator 115. Based on this analog signal, the voltage-controlled oscillator produces a digital clock signal that may be used in interface circuit 114 as the isolation barrier clock.

Modem processor/DSP 102 also communicates the selected frame length to the framer circuit 116 in interface circuit 114. The framer circuit buffers data from modem processor/DSP 102 and packages the buffered data into frames having the selected frame length, by inserting an appropriate number of padding bits at the end of each basic frame.

The present invention provides a number of advantages over prior art isolation barrier interfaces. In particular, both the voltage-controlled oscillator in the system-side interface circuit that generates the barrier clock and the clock-and-data recovery circuit on the line-side interface circuit are enabled to run at an approximately fixed frequency. Both can stay locked to the approximately fixed frequency even when the sample rate changes. Moreover, because they only need to operate over a relatively small frequency range, they can be optimized for low-jitter performance. Finally, the sigma-delta clock in the line-side circuit may be derived directly from the frame synchronization pulse.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A communication circuit for communicating data across a transmission medium at two or more communication rates, the communication circuit comprising:
a variable-rate interface circuit adapted to transmit or receive signals via the transmission medium at an interface clock rate that is (i) about equal to an approximate common multiple of the two or more communication rates and (ii) not equal to an exact common multiple of the two or more communication rates, wherein the frame length for each of the plurality of frames is an integer number that is about equal to a value obtained by dividing the approximate common multiple of the two or more communication rates by the respective communication rate.

2. The communication circuit of claim 1, wherein the two or more communication rates are symbol rates selected from the group consisting of 2400, 2743, 2800, 3000, 3200, and 3429 symbols per second.

3. The communication circuit of claim 1, wherein the two or more communication rates are sample rates selected from the group consisting of 7200, 8000, 8229, 8400, 9000, 9600, 10287, and 11025 samples per second.

4. The communication circuit of claim 1, where the two or more communication rates are sigma-delta rates selected from the group consisting of 1.843, 2.048, 2.107, 2.150, 2.204, 2.458, 2.634, and 2.822 MHz.

5. The communication circuit of claim 1, wherein the approximate greatest common denominator of the two or more communication rates is one of about 33.3 MHz and about 36 MHz.

6. The communication circuit of claim 1, further comprising:
a framer circuit connected to the interface circuit and adapted to produce a plurality of frames, each frame corresponding to at least one of the two or more communication rates and having a frame length.

7. The communication circuit of claim 1, wherein the frame length for each of the plurality of frames is one of (i) between about 12 and about 18 clock cycles and (ii) between about 13 and about 20 clock cycles.

8. The communication circuit of claim 6, further comprising an adjustable clock generator connected to the interface circuit and adapted to produce two or more customized interface clock rates respectively corresponding to the two or more communication rates.

9. The communication circuit of claim 8, wherein the two or more customized interface clock rates are within one of (i) the range of about 32 MHz to about 35 MHz and (ii) the range of about 35 MHz to about 37 MHz.

10. The communication circuit of claim 9, wherein the two or more customized interface clock rates are selected from one of (i) the group consisting of 33.1776, 32.7680, 33.7056, 32.2560, 34.4064, 34.2355, and 33.8688 MHz and (ii) the group consisting of 36.864, 36.864, 35.813, 36.557, 36.864, 36.864, 36.869 and 36.691 MHz.

11. The communication circuit of claim 6, further comprising:
a frame-length lookup table correlating frame length with communication rate; and
a processor adapted to select the frame length for at least one of the plurality of frames by looking up a corresponding one of the two or more communication rates in the frame-length lookup table.

12. The communication circuit of claim 8, further comprising a processor adapted to select one of the first and second customized interface clock rates based on a corresponding one of the first and second communication rates and to pass the selected customized clock rate to the adjustable clock generator.

13. The communication circuit of claim 12, further comprising:
a clock-rate lookup table correlating clock rate with communication rate,
wherein the processor is configured to select the customized interface clock rate by looking up the selected communication rate in the clock-rate lookup table.

14. The communication circuit of claim 12, wherein the adjustable clock generator includes:
an interface clock controller capable of producing a voltage corresponding to the selected customized interface clock rate; and
a voltage-controlled oscillator connected to receive the voltage produced by the interface clock controller and to produce a clock signal having the selected customized interface clock rate, for use as the interface clock signal.

15. A method for communicating data at multiple communication rates over an interface, comprising the steps of:
transmitting over the interface, at a first communication rate, a first frame including a first datum and a first quantity of padding bits corresponding to the first communication rate, at an approximately fixed interface clock rate; and transmitting over the interface, at a second communication rate different than the first communication rate, a second frame including a second datum and a second quantity of padding bits different than the first quantity of padding bits corresponding to the second communication rate, at the approximately fixed interface clock rate, whereby the first datum is communicated at a rate corresponding to the first communication rate and the second datum is communicated at a rate corresponding to the second communication rate, and wherein the method further comprises a framer circuit generating the first frame with a first frame length and the second frame with a second frame length different than the first frame length.

16. The interface circuit of claim 15, wherein each of the first and second communication rates is a symbol rate selected from the group consisting of 2400, 2743, 2800, 3000, 3200, and 3429 symbols per second.

17. The interface circuit of claim 15, wherein each of the first and second communication rates is a sample rate selected from the group consisting of 7200, 8000, 8229, 8400, 9000, 9600, 10287, and 11025 samples per second.

18. The interface circuit of claim 15, wherein each of the first and second communication rates are sigma-delta rates selected from the group consisting of 1.843, 2.048, 2.107, 2.150, 2.204, 2.458, 2.634, and 2.822 MHz.

19. The method of claim 15, wherein the approximately fixed interface clock rate is adjustable within one of (i) the range from about 32 MHz to about 35 MHz, and (ii) the range from about 35 MHz to about 37 MHz.

20. The method of claim 15, wherein the approximately fixed interface clock rate is selected from one of (i) the group consisting of 33.1776, 32.7680, 33.7056, 32.2560, 34.4064, 34.2355, and 33.8688 MHz and (ii) the group consisting of 36.864, 36.864, 35.813, 36.557, 36.864, 36.864, 36.869 and 36.691 MHz.

21. The method of claim 15, wherein:
the first and second frames further include a framing sequence;
the first and second datum are Manchester-encoded; and
the framing sequence comprises three consecutive bits of same value during three consecutive clock cycles at the approximately fixed interface clock rate.

22. The method of claim 15, wherein each of the first quantity of padding bits and the second quantity of padding bits is one of (i) an integer number between 0 and 6, and (ii) and integer number between about 0 and 7.

23. The method of claim 15, further comprising selecting the first frame length and the second frame length by looking up a corresponding one of the first and second communication rates in a frame-length lookup table correlating frame length with communication rate.

24. The method of claim 15, wherein each of the first frame length and the second frame length is an integer number that is about equal to the value obtained by dividing the approximately fixed interface clock rate by the respective communication rate.

25. The method of claim 15, wherein the approximately fixed interface clock rate is about equal to the rate obtained by multiplying a corresponding communication rate by the corresponding frame length.

* * * * *